US006414070B1

(12) United States Patent
Kausch et al.

(10) Patent No.: US 6,414,070 B1
(45) Date of Patent: Jul. 2, 2002

(54) FLAME RESISTANT POLYOLEFIN COMPOSITIONS CONTAINING ORGANICALLY MODIFIED CLAY

(75) Inventors: Charles Kausch, Akron; Anthony Verrocchi, Campbell, both of OH (US); John E. Pomeroy, III, Grapeville, PA (US); Kristen M. Peterson, Pittsburgh, PA (US); Peter F. Payne, Irwin, PA (US)

(73) Assignee: Omnova Solutions Inc., Fairlawn, OH (US)

( * ) Notice: Subject to any disclaimer, the term of this patent is extended or adjusted under 35 U.S.C. 154(b) by 0 days.

(21) Appl. No.: 09/521,457

(22) Filed: Mar. 8, 2000

(51) Int. Cl.[7] .................................................. C08K 3/34

(52) U.S. Cl. ..................... 524/445; 525/240; 525/331.7

(58) Field of Search ................................ 524/445, 447; 525/331.7, 327.4, 240, 243; 501/145, 146, 148

(56) References Cited

U.S. PATENT DOCUMENTS

| | | | |
|---|---|---|---|
| 3,516,959 A | | 6/1970 | Jonas |
| 4,317,737 A | | 3/1982 | Oswald et al. |
| 4,406,800 A | | 9/1983 | Christian |
| 4,434,075 A | | 2/1984 | Mardis et al. |
| 4,558,075 A | | 12/1985 | Suss et al. |
| 4,582,866 A | | 4/1986 | Shain |
| 4,656,062 A | | 4/1987 | Harriet |
| 4,677,158 A | | 6/1987 | Tso et al. |
| 4,683,259 A | | 7/1987 | Goodman |
| 5,475,041 A | | 12/1995 | Weil et al. |
| 5,718,841 A | | 2/1998 | Mardis et al. |
| 5,728,764 A | | 3/1998 | Bauer et al. |
| 5,773,502 A | | 6/1998 | Takekoshi et al. |
| 5,786,417 A | | 7/1998 | Ogawa et al. |
| 6,117,541 A | * | 9/2000 | Frisk .......................... 428/327 |

FOREIGN PATENT DOCUMENTS

| | | |
|---|---|---|
| DE | 199 21 472 | 11/2000 |
| EP | 0 995 591 A1 | 4/2000 |
| GB | 1114174 | 5/1968 |
| JP | 11228748 | 8/1999 |
| WO | WO 99/01504 | 1/1999 |
| WO | WO 00/66657 | 11/2000 |
| WO | WO 00/68312 | 11/2000 |

OTHER PUBLICATIONS

Article: "Tiny Mineral Fillers Bring Big Benefits in Compounding", Modern Plastics Magazine, Nov., 2000, by Peter Mapleston, pp. 72–74.

"Nanocomposites, A Little Goes A Long Way", Lilli Manolis Sherman, *Plastics Technology*, Jun. 1999.

"Plastics and Rubber Nanocomposites Based upon Layered Silicates", C. Zilg, et al., *Kunstsoffe*, 88 (1998) 10, pp. 1812–1820.

"Making Polymers Take the Heat", M. Jacoby, *Chemical and Engineering News*, Oct. 6, 1997.

* cited by examiner

*Primary Examiner*—Edward J. Cain
*Assistant Examiner*—Katarzyna W. Lee
(74) *Attorney, Agent, or Firm*—Robert F. Rywalski; Daniel J. Hudak

(57) ABSTRACT

Nanocomposite compositions comprising organically modified clays and polyolefins or copolymers containing repeat units derived from olefins have flame retardant or flame resistant properties. Sheets and laminates of the nanocomposite can be utilized wherever flame retardant properties are desired.

25 Claims, No Drawings

FLAME RESISTANT POLYOLEFIN COMPOSITIONS CONTAINING ORGANICALLY MODIFIED CLAY

FIELD OF INVENTION

The present invention relates to a nanocomposite composition, comprising polyolefins and organically modified clay, which exhibits flame retardant and flame resistant properties. The composition can be formed into a sheet or film. The sheet can further be utilized in a multi-layer laminate. Both sheets and laminates are flame retardant and are suitable for use as roofing membranes and protective coverings.

BACKGROUND OF THE INVENTION

Traditional flame retardants include numerous halogenated organic compounds which extinguish the ignition (flame) source and inhibit chemical decomposition in the flame and inorganic materials such as aluminum trihydrate which release volatiles such as water which cause the flame to extinguish.

U.S. Pat. No. 4,317,737 relates to polyolefin lubricant base oils which can be gelled by layer and chain type overtreated higher dialkyl dimethyl ammonium clays preferably containing a minimum of 12% excess of the quaternary ion moiety over their ion exchange capacity. For example, an overtreated dihydrogenated ditallow ammonium montmorillonite containing a 22% excess of the quaternary ion can be used to prepare a polydecene based grease although it does not gel mineral oil lubricants.

U.S. Pat. No. 4,434,075 relates to an organophilic clay gellant which comprises the reaction product of an organic cation compound, an organic anion, and a smectite-type clay having a cation exchange capacity of at lease 75 milliequivalents per 100 grams of said clay. The organic cation compound has the formula:

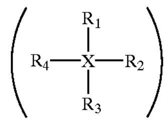

wherein $R_1$ is selected from the group consisting of a β,γ unsaturated alkyl group and a hydroxyalkyl group having 2 to 6 carbon atoms and mixtures thereof; $R_2$ is a long chain alkyl group having 12 to 60 carbon atoms; $R_3$ and $R_4$ are individually selected from the group consisting of a β,γ unsaturated alkyl group, a hydroxyalkyl group having 2 to 6 carbon atoms, an aralkyl group, an alkyl group having from 1 to 22 carbon atoms and mixtures thereof; X is selected from a group consisting of phosphorous and nitrogen. The reaction is carried out in a manner such that an organic cation-organic anion complex is intercalated with the smectite-type clay and the cation exchange sites of the smectite-type clay are substituted with the organic cation.

U.S. Pat. No. 4,582,866 relates to flame retardant thermoplastic multi-block copolyester elastomer compositions containing a bromine-containing flame retardant; antimony trioxide; and an organophilic clay which is the reaction product of at least one quaternary ammonium salt with a smectite clay.

U.S. Pat. No. 4,683,259 relates to resin-containing compositions, e.g. unsaturated polyester or epoxy resin compositions, are prepared using an organoclay of improved dispersibility. The organoclay is prepared by suspending a smectite clay in water to form a fluid suspension; treating the suspension with a solution of an inorganic salt, the cation of which has a valency of at least two, the concentration of the salt being such as to flocculate the smectite clay substantially completely; mixing the suspension of the flocculated smectite clay with a quaternary ammonium compound, at least one of the four alkyl groups of which has from 10 to 24 carbon atoms; and dewatering the resultant product.

U.S. Pat. No. 5,475,041 relates to a flame retardant composition which is provided comprising a normally flammable polyolefin or olefin copolymer, and a flame retardant amount of melamine or salt thereof, a polyphenlyene oxide and a silicaceous material.

U.S. Pat. No. 5,718,841 relates to an organophilic clay comprising the reaction product of:

(a) a smectite-type clay; and (b) a quaternary ammonium compound or compounds selected from the group consisting of:

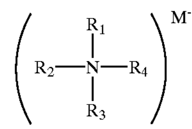

wherein $R_1$ is an unsaturated alkyl-ester group having 8 to 30 carbon atoms as described below and $R_2$, $R_3$ and $R_4$ are independently selected from the group consisting of (i) $R_1$; (ii) long chain linear or branched alkyl (including methyl). Aliphatic or aromatic groups having 1 to 30 carbon atoms (such groups can also include hydroxylated groups); (iii) aralkyl groups, which are benzyl and substituted benzyl moieties, including such groups having fused ring moieties having linear chains or branches of 1 to 30 carbon atoms; (iv) aryl groups such as phenyl and substituted phenyl including fused ring aromatic substitutents; (v) beta, gamma unsaturated groups having six or less carbon atoms or hydroxyalkyl groups having 2 to 6 carbon atoms ; and (vi) hydrogen; and M is an anion selected from the group consisting of chloride, methylsulfate, acetate, iodide and bromide.

U.S. Pat. No. 5,728,764 relates to organoclay compositions which comprise the reaction product of a smectite-type clay having an ion exchange capacity of at least 50 meq. wt. per 100 g. clay (active basis), and an alkoxylated quaternary ammonium compound having one or two alkoxylated chains containing 0–10 moles ethylene oxide and 3–15 moles of propylene or butylene oxide residues are useful thixotropic materials, especially for the preparation of aqueous systems.

U.S. Pat. No. 5,773,502 relates to a flame retardant composition comprising: (a) a thermoplastic polyester and copolyester material, a halogenated organic fire retardant, antimony oxide, organo clay, and a fluorocarbon polymer. Also provided are compositions comprising glass fibers and stabilizers.

SUMMARY OF THE INVENTION

Organically modified clays are distinguished from halogenated flame retardants in that the clays generally form a nanometer scale composite when mixed with polyolefins, which exhibit enhanced fire retardant properties. The resulting nanocomposites do not sag or drip when exposed to a flame source, but hold their shape and inhibit flame spreading. The nanocomposite compositions can be formed into a sheet or laminate and are suitable for numerous applications including roofing membranes.

DETAILED DESCRIPTION

Titles have been provided in this application solely for illustration and do not limit the scope of the invention in any manner.

The compositions of the present invention comprise a polyolefin material integrated with microscopic or nanosize particles of an organoclay material, which form a nanocomposite having enhanced flame retardant or resistant properties when compared to utilizing polyolefins alone. As used herein, nanocomposite is generally defined as substantially randomly dispersed particles of nanosized organoclay particles in a continuous polymeric (i.e. polyolefin) matrix.

The nanocomposites of the present invention should not be confused with ordinary compositions containing unmodified clay, i.e. natural clay and a polymer where the clay simply acts as a non-reinforcing filler, and has negligible impact on physical properties. However, the flame retardant compositions of the present invention can contain other components which also react or interact with the polymer as on a nanoscale level. The flame retardant compositions of the present invention are preferably melt processed.

POLYOLEFINS

The polyolefins utilized in the present invention are thermoplastic polymers or rubbers derived from one or more simple olefins, which have a total of from 2 to about 8 carbon atoms, or copolymers containing repeat units derived from an olefin. Carboxylic acid functionalized polyolefin polymers or copolymers can also be utilized containing up to about 8 percent by weight and preferably from about 1 percent by weight to about 5 percent by weight of the acid wherein the unsaturated acid contains a total of from 2 to about 10 carbon atoms such as acrylic acid, maleic acid, etc., or anhydrides thereof. Examples of polyolefins suitable for the present invention include polyethylene (including low-density, high-density, high molecular weight, ultra-high molecular weight, linear-low-density, very-low density, etc.), maleated polypropylene, polypropylene, polybutylene, polyhexalene, polyoctene, and copolymers, combinations or blends thereof. Examples of copolymers containing repeat units derived from olefins include but are not limited to ethylene-vinyl-acetate (EVA) copolymers.

Preferred polyolefins or copolymers include polyethylene, maleated polypropylene, maleated polyethylene, polypropylene, EVA, copolymers of ethylene and octene, and ethylene-propylene rubber, that is, copolymers of ethylene and propylene. The ethylene propylene rubber that is utilized in the present invention generally contains from about 10 to about 90 weight percent ethylene and from about 90 to about 10 weight percent propylene, and desirably from about 15 to about 85 weight percent ethylene and about 85 to about 15 weight percent propylene. The ethylene and octene copolymer utilized in the present invention generally contains from about 10 to about 90 weight percent ethylene and from about 90 to about 10 weight percent octene, desirably from about 20 to about 80 weight percent ethylene and from about 80 to about 20 percent octene, and preferably from about 30 to about 70 weight percent ethylene and from about 70 to about 30 weight percent octene.

ORGANICALLY MODIFIED CLAY

In the present invention, it is desirable to use an organically modified clay, or organoclay which will form a nanocomposite with the polyolefin. The organically modified clays are generally prepared by reacting a clay with an organic cation or cations provided by specific quaternary ammonium compounds. The polyolefin and organoclay are intimately mixed and dispersed on a microscopic or nanoscale level resulting in a composition having increased heat and flame resistance. The organo clays of the present invention generally have a particle size from about 1 to about 10,000 nanometers, desirably from about 100 to about 2,000 nanometers, and preferably from about 200 to about 500 or 1,000 nanometers.

The organoclays of the present invention at least differ from ordinary untreated clays in the fact that the untreated clays typically form only ordinary phase-separated mixtures when blended or mixed with a polymer. The clays which are organically modified are more easily dispersed in the polymer matrix and can form a nanocomposite of two types: i.e. intercalated or exfoliated structures. It is preferable to utilize a clay with an exfoliated structure. Intercalated nanocomposites have polymer chains which are intercalated between the silicate layers of the clay resulting in a well ordered multilayer, where the layers of the clay retain their structural registry. Exfoliated nanocomposites are those in which the silicate clay layers or platelets having thickness on a nanometer scale, are exfoliated or separated, i.e. mechanically, by shear mixing, and are randomly and highly dispersed throughout the continuous polymer matrix. It is also possible that nanocomposites can be a mixture having both intercalated and exfoliated structures.

In order to obtain better compatibility between the polyolefin and organoclay, it is desirable that the organoclay contains substituted alkyl side chains.

The types of clay minerals which can be utilized include, but are not limited to, smectite, vermiculite, halloysite, or any synthetic analogs or combinations thereof, with smectite-type clay being preferred. Smectite-type clays which are useful in preparing the required organoclays include montmorillonite, hectorite, bentonite, beidellite, stevensite, saponite, nontronite, sauconite, sobokite, and svinfordite.

The preferred clays used to prepare the organophilic clay of this invention are cation-exchangeable smectite clays which have the cation exchange capacity of at least 75 miliequivalents per 100 grams of clay, 100 percent active basis (i.e. beneficiated and essentially free of non-clay impurities). Smectite-type clays are well known in science, geology and in the art of rheological additives, and are commercially available from a variety of sources both in the United States and throughout the world. They are unique among clays in that they exhibit the phenomena of swelling to many times their size when contacted with water.

The organic cations which can be reacted with a clay to form the organically modified clay utilized in the present invention and can be selected from a variety of nitrogen-based quaternary materials that are capable of exchanging cations with the selected smectite-type clay. The organic cations which are reacted with the smectite-type clay to prepare the inventive organophilic clays have a positive charge localized on a single nitrogen atom within the compound.

For this invention, the organic cation is provided by specific quaternary ammonium compounds derived in whole or in part from organic acid-derived esters. This organic cation is provided by a quaternary ammonium compound selected from the group consisting of the following formula:

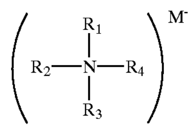

wherein $R_1$ is an alkyl or aralkyl-ester group having 8 to 30 carbon atoms as described below and $R_2$, $R_3$, and $R_4$ are, independently, selected from groups such as (i) $R_1$; (ii) linear or branched alkyl (including methyl), aliphatic, or aromatic groups having 1 to 30 carbon atoms (such groups can also include hydroxylaryl groups); (iii) aralkyl groups, such as benzyl and substituted benzyl moieties, including such groups having fused ring moieties having linear chains or branches of 1 to 30 carbon atoms; (iv) aryl groups such as phenyl and substituted phenyl including fused ring aromatic substituents; (v) beta, gamma-unsaturated groups having six or less carbon atoms or hydroxyalkyl groups having 2 to 6 carbon atoms; and (vi) hydrogen; M is an anion, typically chloride, methyl sulfate, acetate, iodide, and bromide. A further detailed description of organoclay compositions which are suitable for use in the present invention can be found in U.S. Pat. Nos. 5,718,841 and 4,434,075 which are fully incorporated herein by reference.

Suitable organoclays for use in the present invention are available from Southern Clay Products, of Gonzales, Tex., under the trademark Cloisite 15A, Cloisite 20A, and SCPX—1967, from Nanocor, Inc. of Arlington Heights, Ill., tradename Nano #405, and from Rheox, Inc. (Elementis Specialties) of Hightstown, N.J., available as Rheox EA108, EA2827, EA2885, EA2886. Preferred organoclays are available from Rheox as EA2827 and EA2886.

The amount of organoclay utilized in the present invention generally is from about 2 to about 20 parts by weight, desirably, is from about 3 to about 15 parts by weight, and preferably is from about 4 to about 10 parts by weight per 100 parts by weight of polyolefin or polyolefin copolymers.

OTHER FLAME RETARDANTS

While the nanocomposite comprising a polyolefin polymer or copolymer and an organoclay has flame resistant or retardant properties and also does not sag or drip into a flame, thereby inhibiting it, the optional addition of other flame retardants to the composition can further enhance the performance of the nanocomposite compositions.

Flame retardants which can be utilized in the present invention include inorganic flame retardants such as but not limited to aluminum trihydroxide, magnesium oxide, magnesium hydroxide, alumina trihydrate, ammonium polyphosphide, antimony oxide, antimony trioxide, barium borate, calcium sulfate dihydrate, diammonium phosphate, magnesium carbonate, or borate based compounds, or combinations thereof. Preferred inorganic flame retardants of the present invention are magnesium hydroxide, alumina trihydrate and antimony oxide. The inorganic flame retardants of the present invention can be used in an amount generally from about 0 or 0.1 to about 50 parts by weight, desirably from about 1, 5, or 10 to about 35 parts, and preferably from about 15 to about 25 or 30 parts by weight per 100 parts by weight of polyolefin polymer or copolymer.

The present invention is substantially free of polar organic and/or halogenated organic flame retardants. That is, the present invention comprises generally less than 10 parts, desirably less than 5, 3, or 1 parts by weight per 100 parts by weight of polyolefins and preferably is completely free of polar organic and/or halogenated organic flame retardants. Examples include but are not limited to triphenyl phosphate, halogenated organic phosphate, chlorinated polyphosphate, chlorinated organic phosphate, chlorinated paraffin, brominated organics, and chlorinated organics. It is preferable to minimize use of halogenated flame retardants because when exposed to flame or ignition source, they tend to give off or emit toxic or noxious gases such as HCl gas or HBr gas which are also not environmentally friendly. Polar organic compounds are avoided because they have low weatherability, have poor process ability and tend to stick to processing rolls, and give off toxic gases when burned.

ADDITIVES

In addition to the above noted components, the present invention can contain various amounts of conventional processing aids, additives or ingredients. Such compounds include UV inhibitors, release agents, pigments such as carbon black and titanium dioxide, stabilizers, such as hindered phenols, antiozonates, phosphite and sulfides, and antioxidants. This list is merely an example of the potential additives and is by no means exhaustive. Such additives of the present invention can be used in effective amounts to achieve desired properties.

NANOCOMPOSITE PREPARATION

Any method which provides uniform mixing or dispersion between the organoclay with the polyolefin on a nanoscale or microscopic level can be used to prepare the compositions of this invention. Mechanical shearing methods can be employed such as single or twin screw extrusion, injection molding, Banbury type mixing, two-roll milling and the like. Shearing also can be achieved by introducing the polymer melt at one end of an extruder (single or double screw) and receiving the sheared polymer at the other end of the extruder. The temperature of the polymer melt, the length of the extruder, residence time of the melt in the extruder and the design of the extruder (single screw, twin screw, number of flights per unit length, channel depth, flight clearance, mixing zone, etc.) are several variables which control the amount of shear to be applied. It is important that the organoclays and polyolefins form a nanocomposite structure in order that the fire resistant or retardant properties of the compositions are maximized.

Preferably, the compositions of the present invention are processed into a sheet, film, membrane, or the like, or also formed into a multi-ply laminate or membrane.

A desirable method for forming sheeted compositions of the present invention is as follows: desired amounts of raw materials including the organoclay and polyolefins of the present invention are placed in a Banbury type mixer where they are mixed. The drop temperature of the Banbury is about 375° F. Generally, the temperature of the compound is from about 400 to about 440° F., and the mixing lasts for approximately 2 minutes and 20 seconds. The mixture is then transferred to two-roll mill, where the composition is milled and then further transferred to an extruder. The mixture is extruded through a die which preferably forms a rope or string-like extrudate, which can be put on a conveyor belt and transferred to a calender. The extrudate is then calendered to form the finished sheet material which generally has a thickness of from about 6 mils to about 50 mils, and preferably from about 18 mils to about 26 mils. Optionally, after the calendering step a backing and/or other layer or layers can be added or laminated to the flame retardant sheet thus forming a flame retardant laminate.

Another preferred method for preparing sheeted compositions of the present invention is as follows: the desired amounts of raw materials of the present invention are fed, preferably gravimetrically into an extruder, preferably a twin screw extruder and die extruded into a sheet or film. Optionally, the extrudate from the twin screw extruder can further be fed into a single extruder before being die formed into a sheet or film. The flame retardant sheet can be laminated with a backing, other layer or layers to form a flame retardant laminate.

LAMINATES

A further desirable embodiment of the present invention includes forming a laminate including at least one flame retardant sheet of the present invention. While not being limited thereto, a three layer laminate is preferred. The flame retardant laminate generally comprises a top layer comprising a flame retardant sheet of the present invention, a middle layer generally comprises a reinforcing backing such as a woven or nonwoven polymer fabric layer such as polyester, nylon, etc., and a bottom layer which can be any suitable polymer layer such as but not limited to polyolefin polymers or copolymers as defined above, or a polyvinyl chloride layer. The laminates can be formed comprising at least one layer of the above noted flame retardant layer, a backing layer and a bottom or base layer as known by one of ordinary skill in the art. Generally, thicknesses of the at least three layer laminates range from about 20 to about 100 mils, desirably from about 30 to about 90 mils, and preferably from about 40 to about 70 mils.

The flame retardant sheets, laminates or membranes prepared from and according to the present invention are suitable for use where flame retardant properties are needed. Examples of suitable uses include but are not limited to films, laminates, wallcoverings, tents, tarps, and roofing membranes.

The National Highway Traffic Safety Administration standard, MVSS-302, specifies burn resistance standards for materials used in the occupant compartment of motor vehicles in order to reduce deaths and injuries to motor vehicle occupants caused by vehicle fires, especially those originating in the interior of the vehicle from sources such as matches or cigarettes. The MVSS-302 Standard states that a material "shall not burn, nor transmit a flame front across its surface, at a rate of more than 4 inches per minute." The flame retardant sheets or films prepared for the present invention have burn rates generally less than 4 inches per minute, desirably less than 3.5 inches, or less than 3.0 inches per minute and preferably less than 2.5 inches per minute when tested according to MVSS-302. As can be seen by the following examples, the flame retardant membranes of the present invention offer excellent flame retardant and flame resistant properties, and can be extremely beneficial when employed in any of the above stated uses.

The present invention will be better understood by reference to the following examples, which serve to illustrate, but not limit the present invention.

EXAMPLES

The following examples were prepared on a laboratory two-roll hot mill. The temperature of the rolls was approximately 300–350° F. The order of the raw materials is dependent upon the composition of the formulation. Generally, the base polyolefin was added first, followed by the nanocomposite clay, flame retardant (ATH), filler (Aluminum Silicate), color pigment, UV stabilizer, and antioxidant. After sufficient heat fluxing, the compound was sheeted off the mill at the desired thickness and tested according to MVSS-302 test parameters. All components are listed in parts by weight.

MVSS-302 TEST.

The samples of this test are tested in accordance with The National Highway Traffic Safety Administration's MVSS Standard Number 302 for the flammability of interior materials, and a summary of the test procedure is stated below.

A 4 inch wide by 14 inch long sample is inserted into a U-shaped horizontal test fixture. A flame source such as methane or natural gas, typically a Bunsen burner, is applied to the sample so that the flame is ¾ inch below the center of the bottom edge of the open end of the specimen. The sample is allowed to burn until the flame reaches 1½ inches from the end of the sample. The burn rate is calculated according to the formula:

$$B=60\times(D/T)$$

B=burn rate in inches per minute

D=Length the flame travels in inches

T=Time in seconds for the flame to travel D inches

TABLE 1

| Raw Materials | Example 1 | Example 2 | Example 3 | Example 4 | Example 5 | Example 6 | Example 7 | Example 8 | Example 9 | Example 10 |
|---|---|---|---|---|---|---|---|---|---|---|
| Montell Adflex KS353 (ethylene propylene copolymer) | 100.00 | 100.00 | 100.00 | 100.00 | 100.00 | 100.00 | 100.00 | 100 | 100 | 100 |
| Bynel 894 (maleated P.P.) | — | — | — | — | — | — | — | — | — | — |
| SCPX (organoclay) | — | — | — | — | — | — | — | — | — | — |
| Rheox, EA 2886 (Organoclay) | 11.00 | — | — | — | — | — | — | 5.5 | — | — |
| Rheox E-2827 (Organoclay) | — | 5.50 | 5.50 | 5.25 | 11.00 | 5.25 | 6.67 | — | — | 5.5 |
| Rheox EA 108 | | | | | | | — | — | — | — |
| Rheox EA 2885 | | | | | | | — | — | 5.5 | — |
| Cloisite 15A (Organoclay) | — | — | — | — | — | — | — | — | — | — |
| Cloisite 20A (Organoclay) | — | — | — | — | — | — | — | — | — | — |

TABLE 1-continued

| Raw Materials | | | | | | | | | | |
|---|---|---|---|---|---|---|---|---|---|---|
| Antioxidant, Irganox 1010 | — | 0.60 | 0.60 | — | — | — | — | 0.6 | 0.6 | 0.6 |
| Stearic Acid | — | — | — | — | — | — | — | — | — | — |
| UV Stabilizer, Chimassorb 944FD | — | 0.60 | 0.60 | — | — | — | — | 0.6 | 0.6 | 0.6 |
| Ferro white Cl88063 (Pigment) | — | 7.00 | 7.00 | — | — | — | — | 7 | 7 | 7 |
| 72390 $TiO_2$ | — | — | — | — | — | 17.50 | — | — | — | — |
| Hydraprint aluminum silicate | — | 5.50 | — | — | — | — | 13.00 | — | — | — |
| Micral 9400 (ATH) (flame retardant) | — | — | — | — | — | — | — | 20 | 20 | 20 |

| Raw Materials | Example 11 | Example 12 | Example 13 | Example 14 | Example 15 | Example 16 | Example 17 | Example 18 | Example 19 | Example 20 |
|---|---|---|---|---|---|---|---|---|---|---|
| Montell Adflex KS353 (ethylene propylene copolymer) | 100 | 100 | 100 | 100 | 100 | 100 | 100 | 100 | 100 | 100 |
| Bynel 894 (maleated P.P.) | — | — | — | — | — | — | — | — | 3.7 | 3.7 |
| SCPX (organoclay) | — | — | — | — | — | — | — | — | — | — |
| Rheox, EA 2886 (Organoclay) | — | — | — | — | — | — | — | — | — | — |
| Rheox E-2827 (Organoclay) | 5.5 | 5.5 | 5.5 | 8 | — | — | — | — | — | — |
| Rheox EA 108 | — | — | | | | | | | | |
| Rheox EA 2885 | — | — | | | | | | | | |
| Cloisite 15A (Organoclay) | — | — | — | — | 8 | — | — | — | — | 12 |
| Cloisite 20A (Organoclay) | — | — | — | — | — | 8 | — | — | 12 | — |
| Antioxidant, Irganox 1010 | 0.6 | 0.6 | 0.6 | 0.75 | 0.75 | 0.75 | 0.6 | 0.6 | 0.7 | 0.7 |
| Stearic Acid | — | — | — | 0.05 | 0 | 0 | — | — | — | — |
| UV Stabilizer, Chimassorb 944FD | 0.6 | 0.6 | 0.6 | 0.75 | 0.75 | 0.75 | 0.6 | 0.6 | 0.7 | 0.7 |
| Ferro white Cl88063 (Pigment) | 7 | 7 | 10 | 12 | 15 | 15 | 7 | 7 | 7 | 7 |
| 72390 $TiO_2$ | — | — | — | — | — | — | — | — | — | — |
| Hydraprint aluminum silicate | 5.5 | — | — | — | — | — | 5.5 | 5.5 | — | — |
| Micral 9400 (ATH) (flame retardant) | — | — | 20 | — | — | — | — | 20 | — | — |

| Raw Materials | Example 21 | Example 22 | Example 23 | Example 24 |
|---|---|---|---|---|
| Montell Adflex KS353 (ethylene propylene copolymer) | 100 | 100 | 100 | 100 |
| Bynel 894 (maleated P.P.) | 3.7 | 3.7 | 3.7 | 3.7 |
| SCPX (organoclay) | 12 | — | — | 12 |
| Rheox, EA 2886 (Organoclay) | — | — | — | — |
| Rheox E-2827 (Organoclay) | — | — | — | — |
| Rheox EA 108 | | | | |
| Rheox EA 2885 | | | | |
| Cloisite 15A (Organoclay) | — | — | 12 | — |
| Cloisite 20A (Organoclay) | — | 12 | — | — |
| Antioxidant, Irganox 1010 | 0.7 | — | — | — |
| Stearic Acid | — | — | — | — |
| UV Stabilizer, Chimassorb 944FD | 0.7 | — | — | — |
| Ferro white Cl88063 (Pigment) | 7 | — | — | — |
| 72390 $TiO_2$ | — | — | — | — |
| Hydraprint aluminum silicate | — | — | — | — |
| Micral 9400 (ATH) (flame retardant) | — | — | — | — |

RESULTS

TABLE 2

| Sample No. | 1 | 2 | 3 | 4 | 5 | 6 | 7 | 8 |
|---|---|---|---|---|---|---|---|---|
| MVSS-302 TEST RESULTS | 2.22 | 2.24 | 2.02 | 3.13 | 2.22 | 3.14 | 2.53 | 2.42 |
| Sample No. | 9 | 10 | 11 | 12 | 13 | 14 | 15 | 16 |
| MVSS-302 TEST RESULTS | 2.81 | 2.68 | 2.24 | 2.02 | 2.44 | 1.75 | 2.97 | Self Extin-guished |
| Sample No. | 17 | 18 | 19 | 20 | 21 | 22 | 23 | 24 |
| MVSS-302 TEST RESULTS | 6.26 | 6.42 | 4.09 | 2.26 | 2.35 | 4.06 | 2.29 | 2.17 |

As can be seen from the formulations listed in Table 1 and the results listed in Table 2, the compositions of the present invention exhibit greatly enhanced flame retardant properties as compared to a typical polyolefin formulation. The results also show that typical polyolefin formulations do not pass the MVSS-302 burn test, and oppositely, compositions of the present invention obtain excellent test results.

What is claimed is:

1. A flame-retardant laminate, comprising:

a woven or nonwoven polymer fabric reinforcing layer;

a polymer layer; and a flame-retardant nanocomposite layer comprising at least one polyolefin polymer, copolymer, or combinations thereof having from 2 to about 8 carbons per repeat group; at least one organically modified clay; and optionally, at least one inorganic flame-retardant.

2. A flame retardant laminate according to claim 1, wherein said inorganic flame retardant is present in said nanocomposite layer in an amount from about 0.1 to about 50 parts by weight per 100 parts by weight of said polyolefin polymer or copolymer or combinations thereof, and wherein said nanocomposite layer has a burn rate of about less than four inches per minute according to test MVSS-302.

3. A flame-retardant laminate according to claim 2, wherein said nanocomposite layer is substantially free of polar organic and halogenated organic flame-retardants.

4. A flame-retardant laminate according to claim 3, wherein said polyolefin polymer or copolymer of said flame-retardant nanocomposite layer is polyethylene, polypropylene, maleated polypropylene, ethyl-vinyl acetate copolymer, ethylene-propylene rubber, or ethylene-octene copolymer, or combinations thereof, and wherein the amount of said organically modified clay is from about 2 to about 20 parts by weight based on 100 parts by weight of said polyolefin polymer, copolymer, or combinations thereof.

5. A flame retardant laminate according to claim 4, wherein said nanocomposite layer has a burn rate of about less than three inches per minute according to test MVSS-302.

6. A flame-retardant laminate according to claim 5, wherein said polyolefin polymer or copolymer of said nanocomposite layer is said ethylene-propylene rubber, said maleated polypropylene, or said ethylene-octene copolymer, or combinations thereof, wherein the amount of said organically modified clay is from about 3 to about 15 parts by weight, and wherein said polymer fabric reinforcing layer is located between said polymer layer and said flame-retardant nanocomposite layer.

7. A flame-retardant laminate according to claim 6, wherein the amount of said inorganic flame-retardant of said nanocomposite layer is from about 15 to about 30 parts by weight, and wherein said polymer layer is a polyolefin polymer, a copolymer thereof, or a polyvinyl chloride layer.

8. A flame retardant laminate according to claim 7, wherein said organically modified clay of said nanocomposite layer is derived from a cation exchangeable smectite clay which has a cation exchange capacity of at least 75 miliequivalents per 100 grams of clay.

9. A flame-retardant laminate according to claim 1, wherein said laminate is a roofing membrane.

10. A flame-retardant laminate according to claim 1, wherein said polymer fabric layer comprises polyester or nylon.

11. A flame-retardant laminate according to claim 1, wherein said laminate has a thickness from about 20 to about 100 mils.

12. A flame-retardant laminate according to claim 7, wherein said laminate has a thickness from about 40 to about 70 mils.

13. A flame-retardant laminate, comprising:

a flame-retardant nanocomposite layer comprising at least one polyolefin polymer, copolymer, or combinations thereof having from 2 to about 8 carbons per repeat group; at least one organically modified clay; and optionally, at least one inorganic flame-retardant; and a woven or nonwoven polymer fabric reinforcing backing layer.

14. A flame-retardant laminate according to claim 13, wherein said inorganic flame-retardant is present in said nanocomposite layer in an amount from about 0.1 to about 50 parts by weight per 100 parts by weight of said polyolefin polymer or copolymer or combinations thereof, and wherein said nanocomposite layer has a burn rate of about less than four inches per minute according to test MVSS-302.

15. A flame-retardant laminate according to claim 14, wherein said nanocomposite layer is substantially free of polar organic and halogenated organic flame-retardants.

16. A flame-retardant laminate according to claim 15, wherein said polyolefin polymer or copolymer of said flame-retardant nanocomposite layer is polyethylene, polypropylene, maleated polypropylene, ethyl-vinyl acetate copolymer, ethylene-propylene rubber, or ethylene-octene copolymer, or combinations thereof, and wherein the amount of said organically modified clay is from about 2 to about 20 parts by weight based on 100 parts by weight of said polyolefin polymer, copolymer, or combinations thereof.

17. A flame-retardant laminate according to claim 16, wherein said nanocomposite layer has a burn rate of about less than three inches per minute according to test MVSS-302.

18. A flame-retardant laminate according to claim 17, wherein said polyolefin polymer or copolymer of said nanocomposite layer is said ethylene-propylene rubber, said maleated polypropylene, or said ethylene-octene copolymer, or combinations thereof, wherein the amount of said organically modified clay is from about 3 to about 15 parts by weight, and wherein said polymer fabric reinforcing layer is located between said polymer layer and said flame-retardant nanocomposite layer.

19. A flame-retardant laminate according to claim 18, wherein the amount of said inorganic flame-retardant of said nanocomposite layer is from about 15 to about 30 parts by weight, and wherein said polymer layer is a polyolefin polymer, a copolymer thereof, or a polyvinyl chloride layer.

20. A flame-retardant laminate according to claim 19, wherein said organically modified clay of said nanocomposite layer is derived from a cation exchangeable smectite clay which has a cation exchange capacity of at least 75 miliequivalents per 100 grams of clay.

21. A flame-retardant laminate according to claim 13, wherein said laminate is a wallcovering.

22. A flame-retardant laminate according to claim 13, wherein said laminate is a roofing membrane.

23. A flame-retardant laminate according to claim 13, wherein said polymer fabric layer comprises polyester or nylon.

24. A flame-retardant laminate according to claim 13, wherein said laminate has a thickness from about 20 to about 100 mils.

25. A flame-retardant laminate according to claim 20, wherein said laminate has a thickness from about 40 to about 70 mils.

* * * * *